United States Patent
Takahashi (10) Patent No.: US 7,404,083 B2
(45) Date of Patent: Jul. 22, 2008

(54) IMAGE SIGNAL ANALYSIS FOR WATERMARK DETECTION AND DECODING

(75) Inventor: Akihiko Takahashi, Kawasaki (JP)

(73) Assignee: Nikon Corporation, Tokyo (JP)

( * ) Notice: Subject to any disclaimer, the term of this patent is extended or adjusted under 35 U.S.C. 154(b) by 701 days.

(21) Appl. No.: 09/906,071

(22) Filed: Jul. 17, 2001

(65) Prior Publication Data
US 2002/0166050 A1 Nov. 7, 2002

(30) Foreign Application Priority Data
Jul. 18, 2000 (JP) ............... 2000-217352

(51) Int. Cl.
*H04L 9/32* (2006.01)
*G06F 7/08* (2006.01)
*G06K 9/76* (2006.01)

(52) U.S. Cl. ............... 713/176; 726/26; 726/30; 382/100; 382/278

(58) Field of Classification Search ............... 713/176; 382/100; 726/26, 30
See application file for complete search history.

(56) References Cited

U.S. PATENT DOCUMENTS

| | | | | |
|---|---|---|---|---|
| 5,128,525 A * | 7/1992 | Stearns et al. | ............... | 235/454 |
| 5,889,868 A * | 3/1999 | Moskowitz et al. | ......... | 713/176 |
| 5,901,224 A * | 5/1999 | Hecht | ............... | 713/179 |
| 5,949,885 A * | 9/1999 | Leighton | ............... | 380/54 |
| 5,974,548 A * | 10/1999 | Adams | ............... | 713/200 |
| 6,111,990 A * | 8/2000 | Sugaya et al. | ............... | 382/250 |
| 6,118,907 A * | 9/2000 | Matama | ............... | 382/274 |
| 6,263,086 B1 * | 7/2001 | Wang | ............... | 382/100 |
| 6,307,949 B1 * | 10/2001 | Rhoads | ............... | 382/100 |
| 6,327,600 B1 * | 12/2001 | Satoh et al. | ............... | 715/207 |
| 6,442,285 B2 * | 8/2002 | Rhoads et al. | ............... | 382/100 |
| 6,522,767 B1 * | 2/2003 | Moskowitz et al. | ......... | 382/100 |
| 6,529,506 B1 | 3/2003 | Yamamoto et al. | | |
| 6,603,864 B1 * | 8/2003 | Matsunoshita | ............... | 382/100 |
| 6,636,551 B1 * | 10/2003 | Ikeda et al. | ............... | 375/130 |
| 6,643,384 B1 | 11/2003 | Naito et al. | | |
| 6,700,990 B1 * | 3/2004 | Rhoads | ............... | 382/100 |
| 6,721,437 B1 * | 4/2004 | Ezaki et al. | ............... | 382/100 |
| 6,816,967 B1 * | 11/2004 | Iijima et al. | ............... | 713/164 |
| 6,922,777 B1 * | 7/2005 | Iwamura | ............... | 713/165 |
| 6,944,313 B1 * | 9/2005 | Donescu | ............... | 382/100 |
| 6,952,774 B1 * | 10/2005 | Kirovski et al. | ............... | 713/176 |
| 6,971,011 B1 * | 11/2005 | Maes | ............... | 713/176 |
| 6,993,655 B1 * | 1/2006 | Hecht et al. | ............... | 713/176 |
| 7,159,116 B2 * | 1/2007 | Moskowitz | ............... | 713/176 |
| 7,224,799 B2 * | 5/2007 | Mase | ............... | 380/241 |
| 2001/0012019 A1 | 8/2001 | Yamazaki et al. | | |

(Continued)

FOREIGN PATENT DOCUMENTS

JP    A-11-272564    10/1999

(Continued)

*Primary Examiner*—Christopher Revak
*Assistant Examiner*—Matthew T Henning
(74) *Attorney, Agent, or Firm*—Oliff & Berridge, PLC (57) ABSTRACT

An image processing apparatus records an input image signal into another recording medium or displays the input image signal on a display device. When a digital image signal having superimposed thereupon an electronic watermark is input, an identification circuit identifies the method employed to superimpose the electronic watermark. A decode circuit decodes the electronic watermark by employing the electronic watermark superimposing method identified by the identification circuit.

10 Claims, 7 Drawing Sheets

U.S. PATENT DOCUMENTS

| | | |
|---|---|---|
| 2005/0097057 A1* | 5/2005 | DeMello et al. ............... 705/57 |
| 2005/0172125 A1 | 8/2005 | Iwamura |
| 2005/0280723 A1 | 12/2005 | Ohmura |

FOREIGN PATENT DOCUMENTS

| | | |
|---|---|---|
| JP | A-2000-182324 | 6/2000 |
| JP | A-2000-287067 | 10/2000 |
| JP | A-2000-350013 | 12/2000 |
| JP | A-2001-125484 | 5/2001 |

* cited by examiner

IMAGE SIGNAL ANALYSIS FOR WATERMARK DETECTION AND DECODING

INCORPORATION BY REFERENCE

The disclosure of the following priority application is incorporated herein by reference: Japanese Patent Application No. 2000-217352 filed Jul. 18, 2000

BACKGROUND OF THE INVENTION

1. Field of the Invention

The present invention relates to an image signal processing apparatus that detects an electronic watermark embedded in image data obtained by performing a photographing operation with a digital camera or the like.

2. Description of the Related Art

Digital image data obtained by performing a photographing operation with a digital camera are recorded in a recording medium such as a CF (compact flash) card. The digital image data are read from the recording medium into a hard disk device or a memory device in a personal computer and a specific application program is executed on the personal computer to display the digital image data on a display unit connected to the personal computer, which may be a display device or a projection device. There are also apparatuses in the known art that display a digital image directly read from a recording medium on a display device without necessitating the use of a personal computer. In addition, storage apparatuses that copy image data recorded in a portable recording medium such as a CF card into another recording medium which may be an MO or a CD-R and file the image data thus copied as well as simply read out image data and display the image data on a display device have been brought into practical application.

Digital image data which are handled as described above can be duplicated easily. For this reason, rigorous development efforts have been made in the area of electronic watermarking technology that may be employed for the protection of digital image data copyright. An electronic watermark is made by embedding copyright information in digital image data, so that it is ensured that the copyright information will not be lost even after image processing such as format conversion or retouching is implemented on the image data. The copyright information embedded in the digital image data may be checked by executing an application program for identifying the electronic watermark constituting the copyright information on a personal computer or the like.

A plurality of methods for embedding an electronic watermark in image data have been proposed in correspondence to the following factors (1)~(3) with regard to image data to be handled.

(1) The volume of information to be embedded in the image data;

(2) The level of editing tolerance which retains the information even after image processing such as format conversion is implemented on the image data as described above;

(3) The extent to which the quality of the image becomes degraded due to information embedding.

It is to be noted that in this specification, embedding an electronic watermark in image data is also referred to as superimposing an electronic watermark on image data. In other words, there are a plurality of methods employed to superimpose an electronic watermark on image data in the known art.

However, the following problems must be addressed when a plurality of methods for superimposing electronic watermarks are employed. In order to read copyright information written into digital image data, application programs for electronic watermark reproduction must be executed one at a time in correspondence to each of the plurality of methods for superimposing electronic watermarks to check the copyright information after first taking the digital image data into the personal computer. In particular, if different methods for superimposing electronic watermarks are employed for various sets of digital image data to be processed, a great length of time must be spent to check the copyright information and the verification operation becomes complicated. In addition, it is necessary to first create duplicate data by taking the image data to be processed into the personal computer without obtaining the copyright holder's consent, in order to check the copyright information.

SUMMARY OF THE INVENTION

An object of the present invention is to provide an image signal processing apparatus that is capable of identifying the specific electronic watermark superimposing method employed to embed a watermark in digital image data before, for instance, creating duplicate image data.

The present invention may be employed to identify the method employed to superimpose the electronic watermark on the image signal which has been input. The object described above is achieved by providing an input device that inputs an image signal and an identification circuit that identifies the method employed to superimpose an electronic watermark on the image signal input through the input device in the image processing apparatus according to the present invention.

This image signal processing apparatus may include a display device that displays the image signal which has been input and a recording processing device that records the input image signal into a recording medium.

It is desirable that the apparatus be further provided with a detection circuit that detects whether or not an image signal has been input by the input device and a control circuit that implements control on the identification circuit so as to allow the identification circuit to start identifying the electronic watermark superimposing method when the detection circuit detects an image signal input.

The identification circuit may sequentially judge which of a plurality of electronic watermark superimposing methods set in advance matches the method employed to superimpose the electronic watermark on the input image signal.

The image signal processing apparatus may include an information input device that is employed to input information with respect to a new electronic watermark superimposing method and an information adding device that adds identification information which enables the identification circuit to identify the new superimposing method input by the information input device. It is also desirable to provide a decode circuit that decodes the electronic watermark through the electronic watermark superimposing method identified by the identification circuit. The decoded electronic watermark is displayed on the display device.

Alternatively, the image processing apparatus according to the present invention comprises an input device that inputs an image signal, an identification circuit that identifies the method employed to superimpose an electronic watermark on the image signal input through the input device, a recording processing device that records the input image signal in a recording medium, a display device that displays the input image signal and a decode circuit that decodes the electronic watermark through the electronic watermark superimposing method identified by the identification circuit to achieve the object described above.

This image processing apparatus, too, may include an information input device utilized to input information with respect to a new electronic watermark superimposing method and an information adding device that adds identification information which enables the identification circuit to identify the new superimposing method input by the information input device. The electronic watermark decoded by the decode circuit is displayed at the display device. In addition, the identification circuit may sequentially judge which of a plurality of electronic watermark superimposing methods set in advance matches the method employed to superimpose the electronic watermark on the input image signal.

The various image processing apparatuses described above are all capable of taking in image data after identifying the copyright information through the watermark.

DESCRIPTION OF THE PREFERRED EMBODIMENTS

The following is an explanation of the preferred embodiments of the present invention, given in reference to the drawings.

FIRST EMBODIMENT

Figure 1:
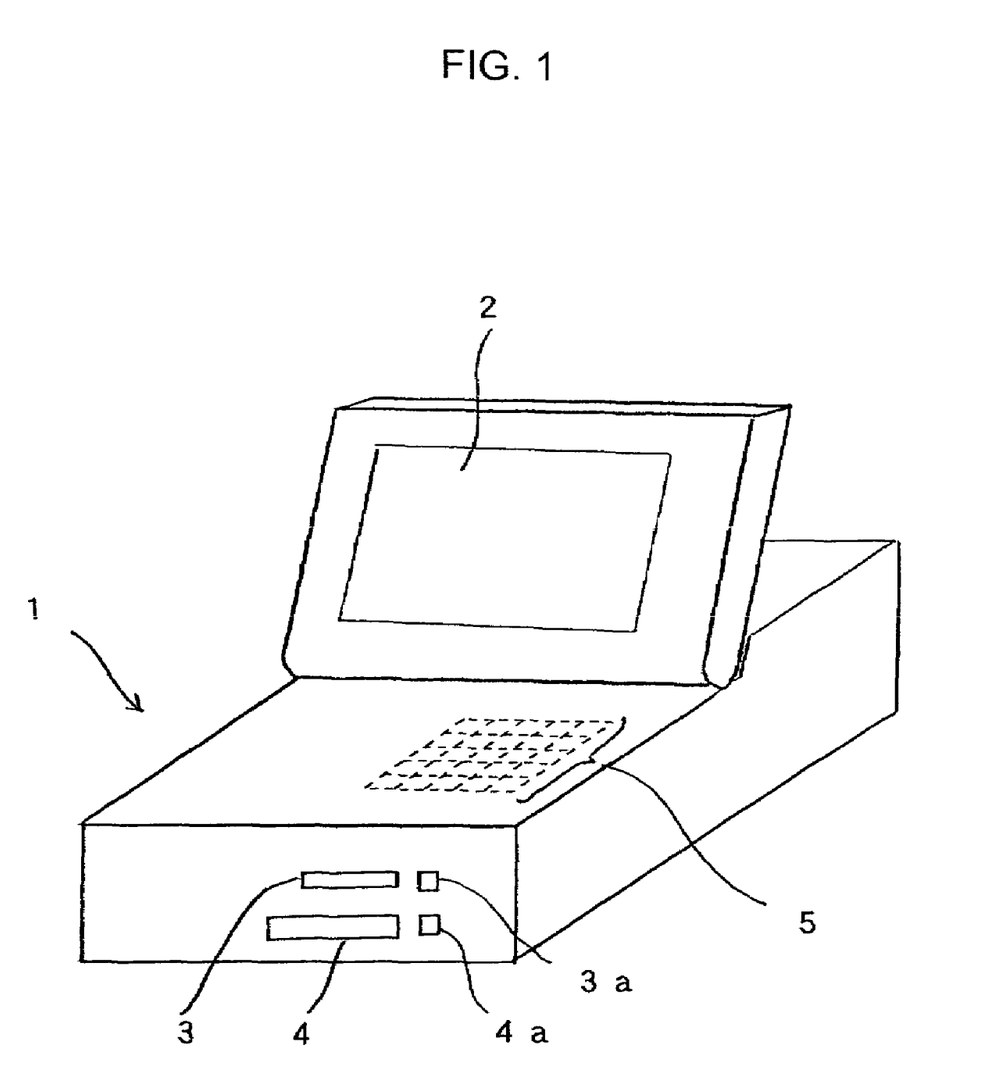
FIG. 1 is a simplified overview of the image data storage apparatus achieved in a first embodiment.

FIG. 1 is a simplified external view of the image data storage apparatus achieved in the first embodiment of the present invention. In FIG. 1, an image storage apparatus 1 comprises a display monitor 2, a slot 3 into which a first recording medium such as a memory card is detachably loaded, a slot 4 into which a second recording medium other than a memory card such as an MO or a CD-R that allows data to be recorded through a magnetic recording method, for instance, is detachably loaded, and an operating panel 5 through which the image data storage apparatus 1 is operated. Eject buttons 3a and 4a are operating buttons operated to eject the first recording medium and the second recording medium loaded in the slot 3 and the slot 4 respectively.

In the image data storage apparatus 1 shown in FIG. 1, when a display operation is performed through the operating panel 5 after loading in the slot 3 the first recording medium having stored therein image data having been recorded in a digital still camera, specific digital image data are read out from the first recording medium and are displayed on the display monitor 2. In addition, when a display operation is performed through the operating panel 5 after loading the recording medium in the slot 4, specific digital image data are read out from the second recording medium and are displayed on the display monitor 2 in a similar manner. When a copy operation is performed through the operating panel 5 with the first recording medium loaded in the slot 3 and the second recording medium loaded in the slot 4, the image data recorded in the first recording medium may be recorded into the second recording medium or the image data recorded in the second recording medium may be recorded into the first recording medium. An operation through which data recorded in a recording medium are read out and recorded into a recording medium adopting a recording method other than the recording method employed in the original recording medium is referred to as media conversion.

Figure 2:
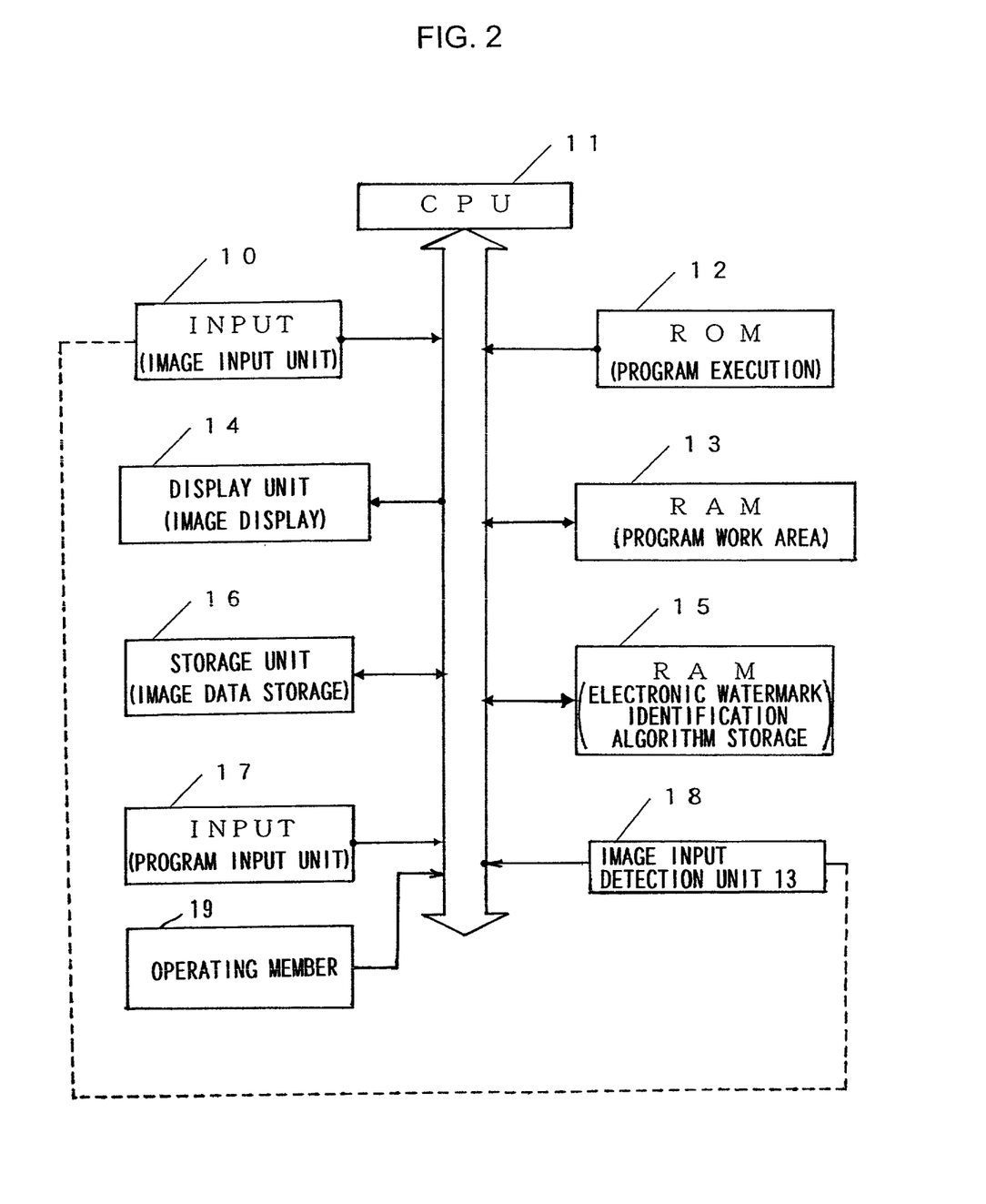
FIG. 2 is a block diagram of the image data storage apparatus 1 shown in FIG. 1.

FIG. 2 presents a block diagram of the image data storage apparatus 1 in FIG. 1. In FIG. 2, the image data storage apparatus 1 (see FIG. 1) comprises a CPU 11 that controls the apparatus, an image input unit 10, a display unit 14, a storage unit 16, a ROM 12, a RAM 13, a RAM 15, a program input unit 17, an image input detection unit 18 and an operating member 19.

The CPU 11 implements control on the various instruments and devices constituting the image data storage apparatus 1. The image input unit 10 inputs image data from a detachable recording medium. The display unit 14 is provided to display the image data. In the storage unit 16, the image data are recorded. A control program is stored in the ROM 12. The RAM 13 has a recording area which is used when executing the control program.

Electronic watermark read programs are recorded in the RAM 15. The electronic watermark read programs each include an identification program and a decode program. The identification program is executed to identify through a specific algorithm which of a plurality of electronic watermark superimposing methods matches the electronic watermarking method employed with regard to the input image data. The decode program is executed to decode the electronic watermark in conformance to the electronic watermark superimposing method thus identified.

The program input unit 17 is engaged to add an electronic watermark read program which is different from the electronic watermark read program stored in the RAM 15 or to input a program for modifying an electronic watermark read program already stored in the RAM 15. The image input detection unit 18 detects whether or not image data have been input to the image input unit 10. The operating member 19 is used by the operator to perform a specific operation on the image data storage apparatus 1.

The image input unit 10 is an interface provided inside the slot 3 shown in FIG. 1. When the first recording medium mentioned earlier, which may be a compact flash (CF) card, is loaded into the slot 3, the contents recorded in the first recording medium are read by the image input unit 10. The image input detection unit 18 mechanically detects the presence of the CF card loaded in the slot 3. The storage unit 16 is constituted as an interface internally provided at the slot 4 shown in FIG. 1, and when the second recording medium mentioned earlier is loaded into the slot 4, various types of information are written into the storage unit 16.

The storage unit 16 is also utilized as the program input unit 17. When a third recording medium having a program written therein is loaded into the slot 4 in FIG. 1, the program input unit 17 reads the contents recorded in the third recording medium. In other words, the program input unit 17 has a function of an interface as well. To summarize, the second recording medium for image data recording is loaded into the slot 4 in FIG. 1 when image data is recorded into the storage unit 16. If, on the other hand, the program input unit 17 is engaged to read a program, the third recording medium having a program written therein is loaded in the slot 4. The second recording medium for image data recording and the third recording medium having the program written therein are physically the same.

The display unit 14 constitutes the display monitor 2 shown in FIG. 1 which is employed to display image data. The operating member 19 is provided at the operating panel 5 in FIG. 1.

In FIG. 2, the CPU 11 reads out and starts up the control program stored in the ROM 12 when the power to the image data storage apparatus 1 is turned on. Once the control program is started up, the RAM 13 is utilized as a work area for program execution. As explained earlier, a plurality of electronic watermark read programs are stored in the RAM 15.

After the CF card is loaded at the image input unit 10, its presence is detected by the image input detection unit 18. When the detection signal provided by the image input detection unit 18 is input to the CPU 11, specific image data recorded in the CF card are read out to the work area in the RAM 13 in response to a command issued by the CPU 11. The CPU 11 reads out a first electronic watermark superimposing method identification program from the RAM 15 and checks to determine whether or not the electronic watermark in the image data read out to the RAM 13 can be detected a, i.e., whether or not the watermark can be read, in conformance to the first identification algorithm.

If it is decided that the electronic watermark in the image data can be detected, the CPU 11 decodes the watermark information by executing the corresponding decode program and displays the decoded watermark on the display unit 14. Then, the CPU 11 displays the image data on the display unit 14 if necessary. At this time, the electronic watermark may be displayed together with the image data or it may not be displayed. In addition, if an instruction has been issued to record the image data into the storage unit 16, the image data displayed on the display unit 14 are recorded in the storage unit 16. If, on the other hand, the electronic watermark in the image data read out to the RAM 13 is not detected in conformance to the first identification algorithm, a second electronic watermarking method identification program is read out from the RAM 15 and a decision is made as to whether or not the electronic watermark in the image data read out in the RAM 13 can be detected in conformance to the second identification algorithm.

If it is decided that the electronic watermark in the image data can be detected, the CPU 11 decodes the watermark information and displays the decoded watermark on the display unit 14 by executing the corresponding decode program, in a manner similar to that with which the CPU 11 decodes the electronic watermark when the electronic watermark is determined to be detectable in conformance to the first identification algorithm mentioned above. If, on the other hand, it is decided that the electronic watermark in the image data read out in the RAM 13 cannot be detected in conformance to the second identification algorithm, a third electronic watermark superimposing method identification algorithm is read out from the RAM 15 and a decision is made as to whether or not the electronic watermark in the image data read out in the RAM 13 can be detected in conformance to a third identification algorithm.

Subsequently, whenever the electronic watermark in image data is determined to be detectable, the electronic watermark is decoded and displayed on the display unit 14 by executing the corresponding decode program in a similar manner. If it is decided that the electronic watermark in image data cannot be detected, a new electronic watermark superimposing method identification program is read out from the RAM 15 to determine whether or not the electronic watermark in the image data read out in the RAM 13 can be detected.

Electronic watermarking is achieved by inserting data indicating a copyright or the like into digital data in order to protect the copyright to the digital data which may be an image or sound. In the case of image data for instance, in order to create an electronic watermark data indicating the copyright are embedded in a pixel having a low degree of brightness which is adjacent to a pixel achieving a high degree of brightness, by taking advantage of the human visual/audio sensory characteristics. Various electronic watermark embedding methods (superimposing methods) have been developed to date. Accordingly, the method employed to embed an electronic watermark among a plurality of methods is identified according to the present invention. While data indicating a copyright are embedded in low noise data with a frequency close to the frequency of high noise data in the case of audio data, for instance, the details of the specific embedding methods that may be employed are not an issue in this specification.

Figure 3:
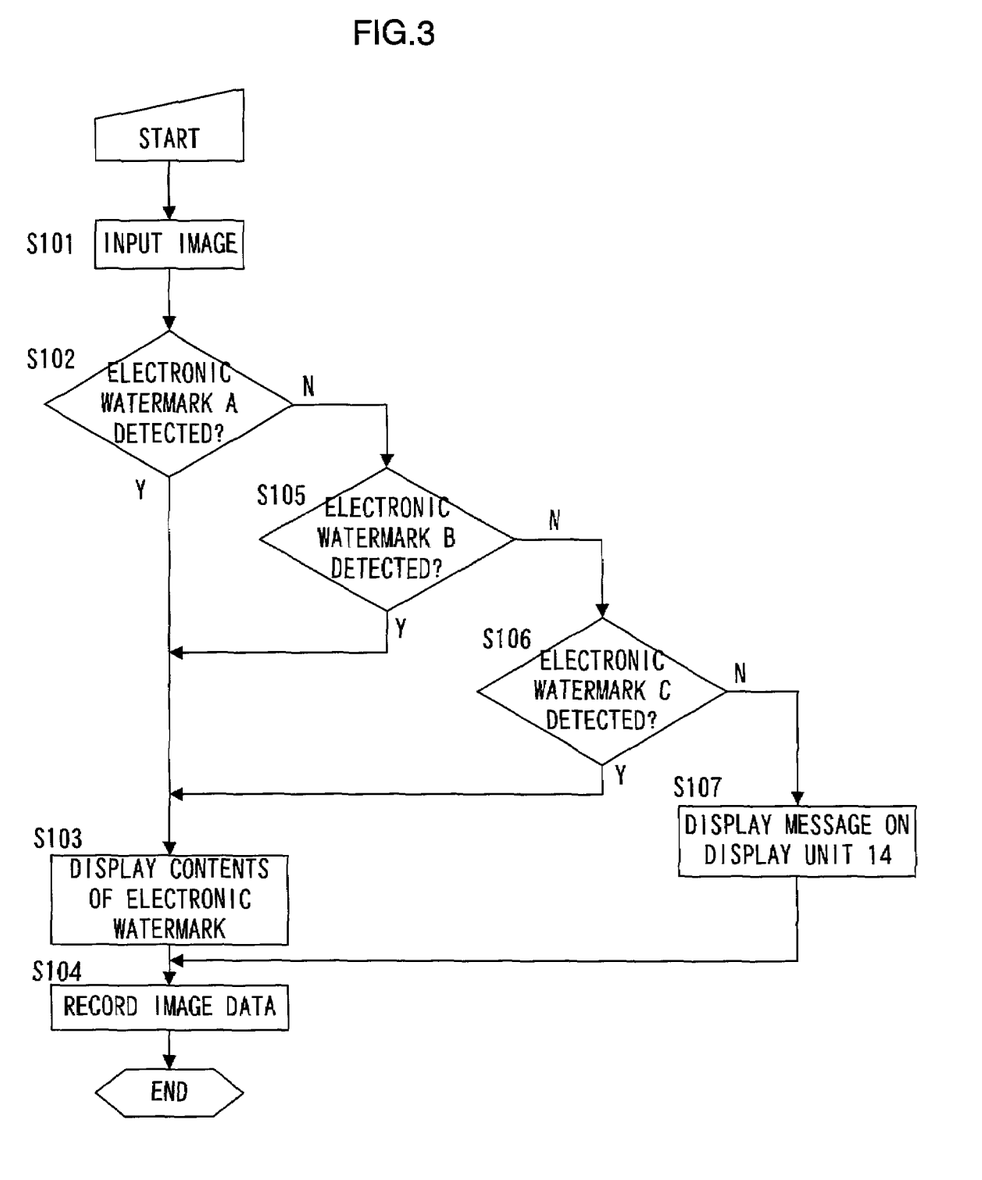
FIG. 3 is a flowchart of the identification processing executed by the CPU to identify electronic watermark superimposing methods.

An explanation is given in reference to the flowchart in FIG. 3 on the electronic watermark superimposing method identification processing implemented at the CPU 11 of the image data storage apparatus 1 described above. Identification program for identifying electronic watermark superimposing methods and decode programs are stored in the RAM 15. The identification programs each adopt an algorithm for identifying one of three methods, i.e., an electronic watermark superimposing method A, an electronic watermark superimposing method B and an electronic watermark superimposing method C. In the first embodiment, through the identification processing for identifying these three watermarking methods, the method employed to superimpose an electronic watermark by embedding the electronic watermark in image data is determined.

As a CF card detection signal is output from the image input detection unit 18 in step S101, specific image data recorded in the CF card are read out to the RAM 13 and the identification processing for identifying the method employed to superimpose the electronic watermark on the image data read out to the RAM 13 is started. At this point in time, the image data read out to the RAM 13 are simply held in the RAM 13 on a temporary basis unlike when recording the image data in the storage unit 16.

In other words, if the image data to undergo the processing are copyrighted, the image data are prevented from being duplicated at the storage unit 16 in response to simply loading the recording medium in the slot.

In step S102, a decision is made as to whether or not the electronic watermark can be detected through specific processing corresponding to the electronic watermark superimposing method A with regard to the image data read out to the RAM 13. If it is decided that the electronic watermark can be detected (step S102 Y), the operation proceeds to step S103, whereas if it is decided that the electronic watermark cannot be detected (step S102 N), the operation proceeds to step S105.

In step S103, the decode program is executed to decode through a specific algorithm the electronic watermark detected in conformance to the corresponding electronic watermark superimposing method and display the decoded electronic watermark on the display unit 14. The operator checks the electronic watermark displayed on the display unit 14. For instance, if any copyright information is included in the electronic watermark displayed on the display unit 14, the operator verifies that he is allowed to duplicate the image data. If the operator operates the operating member 19 (see FIG. 2), in step S104 the image data read out in the RAM 13 are displayed on the display unit 14 and the image data are recorded into the storage unit 16 before the processing in FIG. 3 ends.

In step S105, a decision is made as to whether or not the electronic watermark can be detected through specific processing corresponding to the electronic watermark superimposing method B with regard to the image data read out to the RAM 13. If it is decided that the electronic watermark can be detected (step S105 Y), the operation proceeds to step S103, whereas if it is decided that the electronic watermark cannot be detected (step S105 N), the operation proceeds to step S106.

In step S106, a decision is made as to whether or not the electronic watermark can be detected through specific processing corresponding to the electronic watermark superimposing method C with regard to the image data read out to the RAM 13. If it is decided that the electronic watermark can be detected (step S106 Y), the operation proceeds to step S103, whereas if it is decided that the electronic watermark cannot be detected (step S106 N), the operation proceeds to step S107.

In step S107, a message "No electronic watermark detected. Image data determined to be not copyrighted. Record image data?" is displayed on the display unit 14 and then the operation proceeds to step S104 mentioned earlier. The operator verifies that no electronic watermark has been detected by reading the message displayed on the display unit 14.

Figure 4:
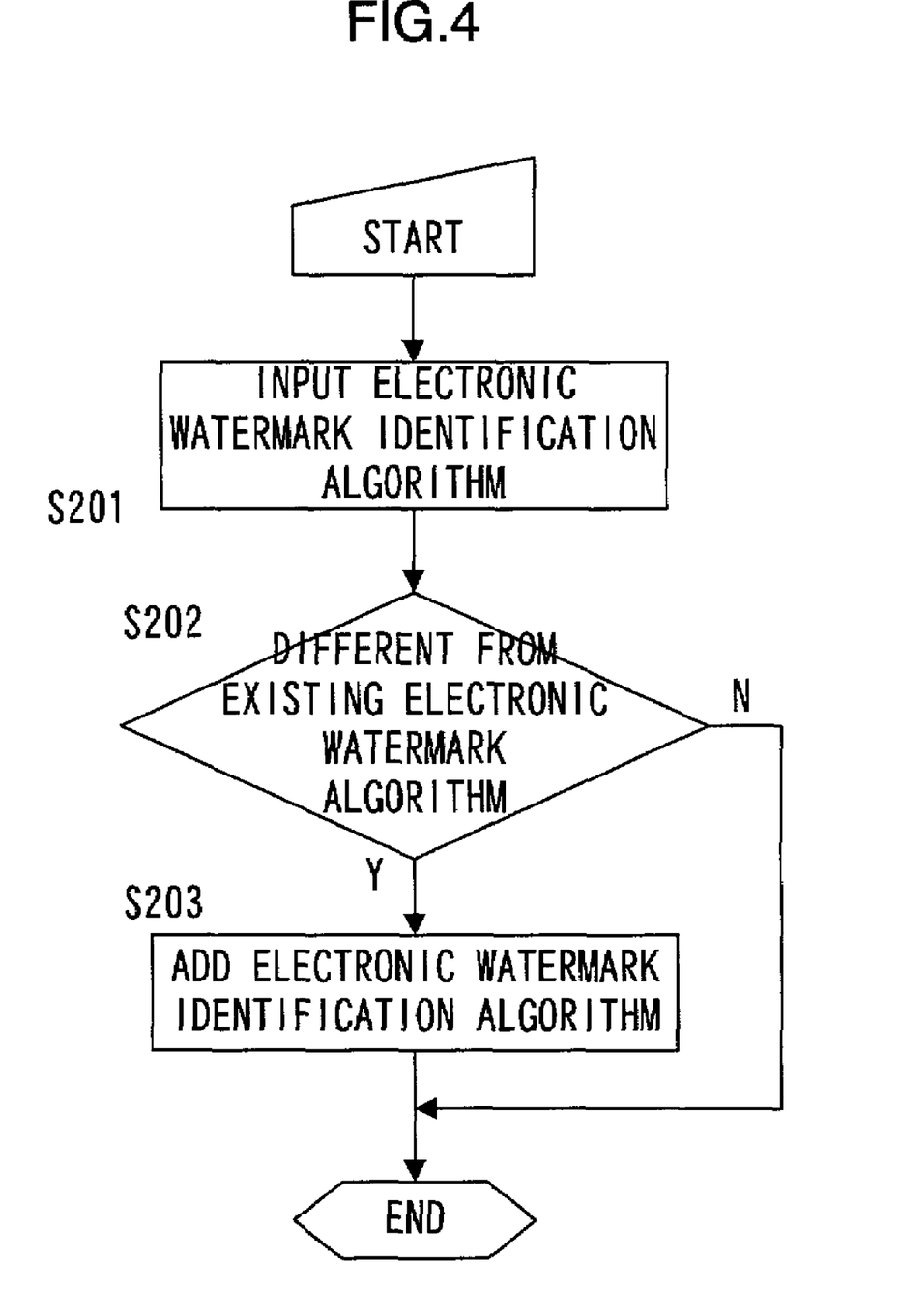
FIG. 4 is a flowchart of the procedure through which an identification algorithm is added to enable identification of a new electronic watermark superimposing method.

Next, an explanation is given on how an electronic watermark read program for identifying an electronic watermarking method and decoding the electronic watermark may be added. FIG. 4 presents a flowchart of the procedure through which an identification program adopting an identification algorithm for identifying a new electronic watermark superimposing method D is added to the image data storage apparatus 1.

In step S201, after the operator loads the third recording medium having stored therein the identification program for identifying the electronic watermark superimposing method D in the slot 4 (see FIG. 1), the program is read out through the program input unit 17 (see FIG. 2). In step S202, the CPU 11 makes a decision as to whether or not the electronic watermark superimposing method identification algorithm employed in the electronic watermark read program thus read out is different from any of the existing algorithms stored in the RAM 15. If it is decided that the electronic watermark superimposing method identification algorithm is different (step S202 Y), the operation proceeds to step S203 and the new electronic watermark read program is added into the RAM 15 as the identification algorithm for identifying the electronic watermark superimposing method D, and then the processing in FIG. 4 ends. After the identification program and the decode program corresponding to the electronic watermark superimposing method D are added into the RAM 15, subsequent image data electronic watermark superimposing method identification is performed by detecting electronic watermarks through specific processing corresponding to the electronic watermark superimposing methods A~D.

If, on the other hand, it is decided in step S202 that the identification algorithm matches an existing identification algorithm (step S202 N), the processing in FIG. 4 ends without adding the identification algorithm into the RAM 15.

The following advantages are achieved in the first embodiment explained above.

(1) Since an electronic watermark embedded in image data is checked before recording the image data into the storage unit 16, copyright information recorded in the image data is checked first to prevent illegal duplication of the image data.

(2) The identification algorithms corresponding to the electronic watermark superimposing methods A~C recorded in advance in the electronic watermark read programs are sequentially used to identify the method employed to superimpose an electronic watermark by embedding the electronic watermark in image data. As a result, even if it is not clear which electronic watermark superimposing method was employed to embed the electronic watermark in a given set of image data when handling a plurality of kinds of image data in the image data storage apparatus 1, the image data storage apparatus 1 automatically identifies the electronic watermark superimposing method to enable the verification of the electronic watermark. Consequently, an apparatus that enables simple and easy electronic watermark verification operation is achieved.

(3) Since the image input detection unit 18 detects the presence of a CF card, the watermark in image data is automatically checked once the CF card is loaded. Thus, the ease and convenience achieved in (2) above are further enhanced in the apparatus.

(4) A new electronic watermark superimposing method identification program is input through the program input unit 17 to be stored in the RAM 15 as an addition. As a result, a newly developed electronic watermark superimposing method can be incorporated without having to modify the image data storage apparatus 1 to enable verification of an electronic watermark embedded in image data through the new electronic watermark superimposing method.

SECOND EMBODIMENT

In the first embodiment, the method employed to embed an electronic watermark in image data is identified by sequentially using the algorithms for identifying the electronic watermark superimposing method A, the electronic watermark superimposing method B and the electronic watermark superimposing method C. In the second embodiment, the electronic watermark superimposing method is identified based upon the data name assigned to image data.

Figure 5:
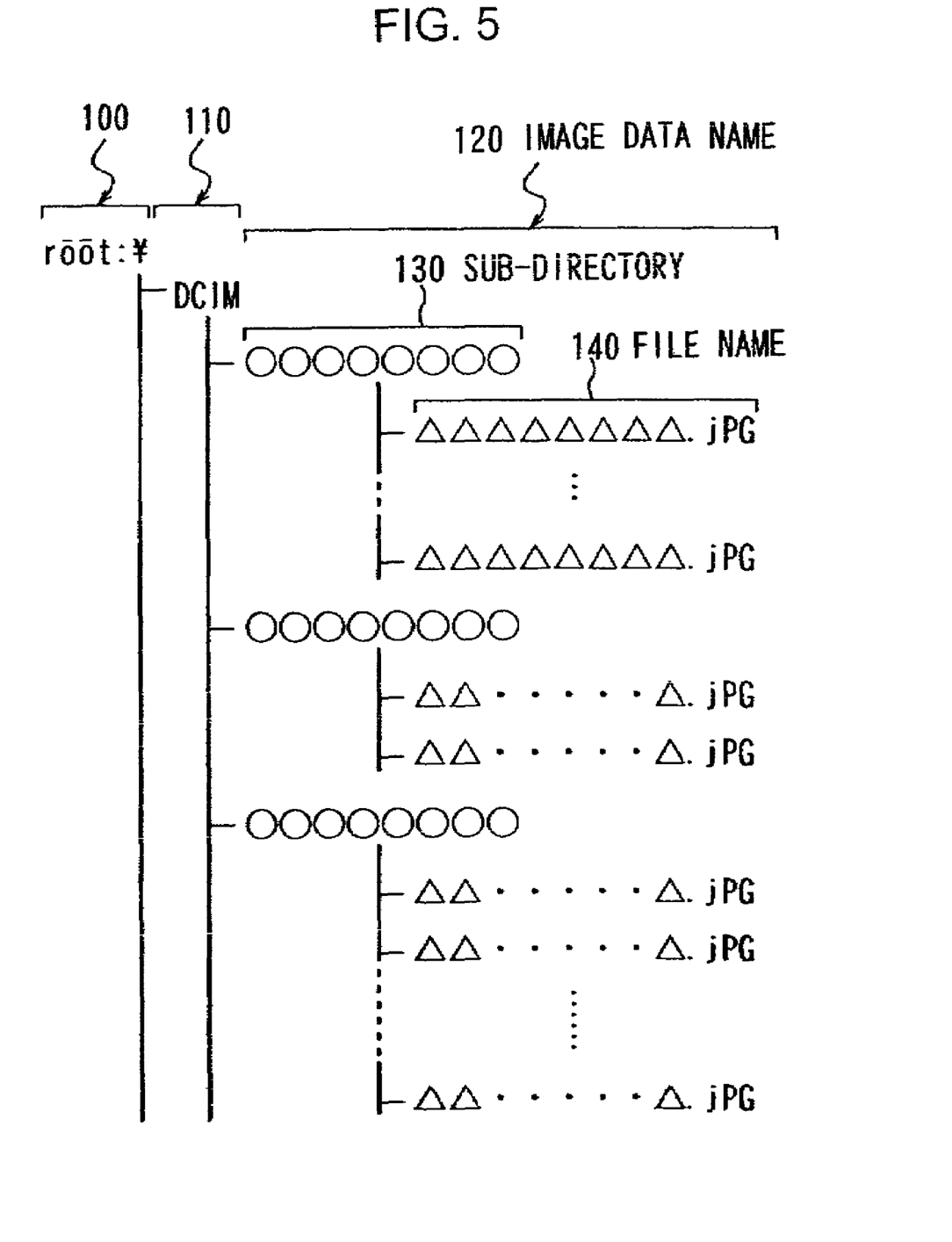
FIG. 5 is provided to facilitate an explanation of the data names assigned when recording the data in a recording medium.

FIG. 5 is provided to facilitate an explanation of data names assigned when recording data obtained through a photographing operation performed with a digital still camera into a recording medium such as a CF card. The so-called directory tree presented in FIG. 5 illustrates the structure of data files managed in, for instance, a personal computer (PC). It is desirable that the format employed to record image data having been recorded in a digital camera matches the format of data managed in the personal computer so that the image data can be processed on the computer and the recorded image can be output to the printer via the personal computer. Accordingly, the DCF (design rules for camera file systems) stipulate that the name of image data recorded in a digital camera is written in a "DCLM" directory 110 assigned under a root directory 100 shown in FIG. 5.

An explanation is given with regard to an image data name 120 provided under the directory 110. As shown in FIG. 5, the image data name 120 is constituted of a sub-directory 130 to which a plurality of names may be assigned and a file name 140 to which a plurality of names may be assigned provided under each sub-directory 130. This structure matches the DOS structure used in a system such as the personal computer 2 that handles a storage device. It is to be noted that in some personal computer basic programs (OS), directories are referred to as folders.

Figure 6:
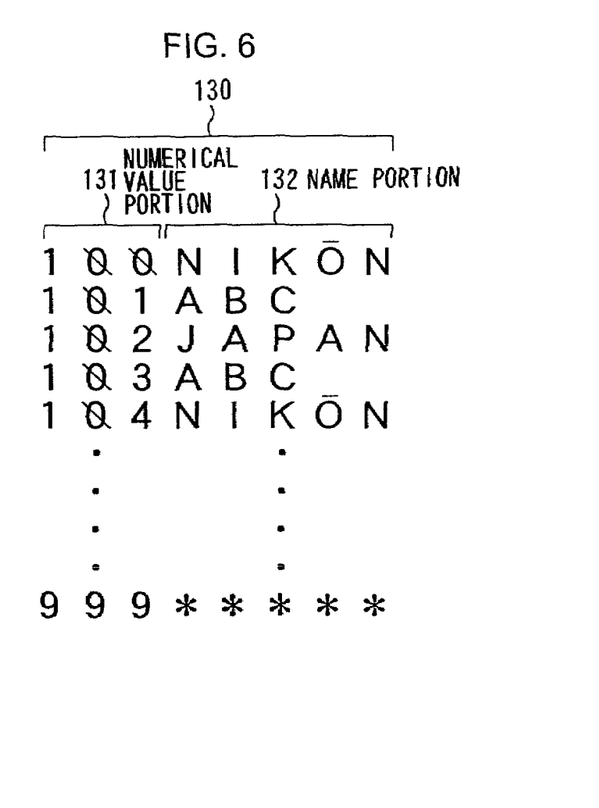
FIG. 6 is provided to facilitate an explanation of the sub directories.

FIG. 6 is provided to facilitate an explanation of a sub-directory 130. The sub-directory 130 may be constituted of a numerical value portion 131 and a name portion 132. Stored in the numerical value portion 131 is a three-digit integer, whereas stored in the name portion 132 is up to five alphanumeric characters or symbols. Different name portions 132 may be provided in the individual sub-directories 130, or a single name portion 132 may be used in different sub-directories 130. Even when the same name portion 132 is used, the sub-directories 130 can be distinguished from each other by assigning different integers in the numerical value portions 131 of the sub-directories 130.

Figure 7:
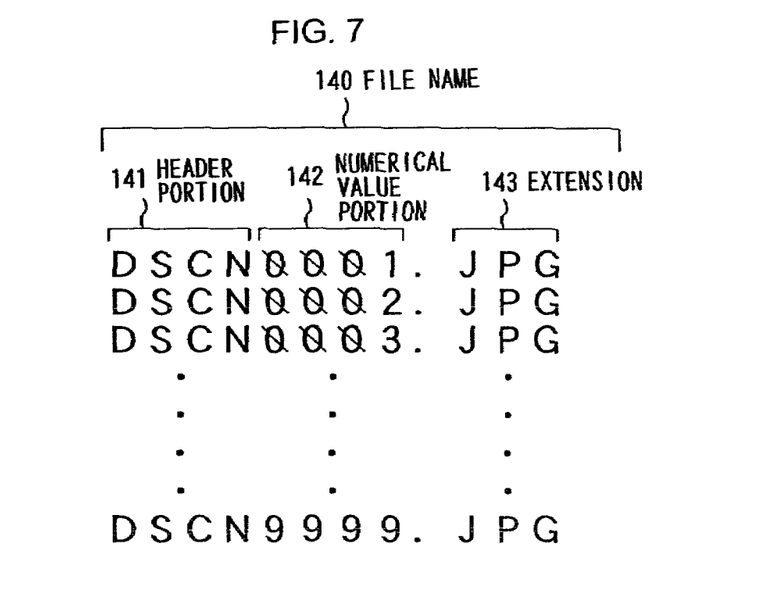
FIG. 7 is provided to facilitate an explanation of the filenames.

FIG. 7 is provided to facilitate an explanation of a file name 140. The file name 140 may be constituted of, for instance, a header portion 141, a numerical value portion 142 and an extension 143. Four alphabetic characters are assigned in the header portion 141. "DSCN" indicates that the data assigned with the file name 140 are image data having been recorded in a digital still camera. A four-digit integer is assigned in the numerical value portion 142. The extension 143, i.e., "JPEG", indicates that the image data assigned with the file name 140 are image data having been compressed in the JPEG format. As explained above, by assigning a name constituted of the sub-directory 130 and the file name 140 to a set of image data having been recorded in a digital still camera, the image data are readied to undergo processing in the personal computer.

An inherent name is assigned as the image data name 120 by the manufacturer of the digital camera used to record the image data. Thus, the manufacturer of the digital camera can be identified in correspondence to the file name of image data recorded in the digital camera. If the electronic watermarking method employed by the manufacturer is disclosed to the public, the electronic watermarking method can be identified based upon the image data file name. Namely, the electronic watermarking method is determined by using the name assigned to the image data.

The block diagram of the image data storage apparatus achieved in the second embodiment will be identical to the block diagram presented in FIG. 2, which illustrates the first embodiment. The image data storage apparatus in the second embodiment uses a different control program stored in the ROM 12 in FIG. 2 from that used in the first embodiment. When the control program of the image data storage apparatus in the second embodiment is started up, identification programs using specific algorithms for identifying image data filenames and decode programs for decoding electronic watermarks are stored in the RAM 15. As a CF card is loaded into the image input unit 10, its presence is detected by the image input detection unit 18. When a detection signal from the image input detection unit 18 is input to the CPU 11, the file name assigned to a specific set of image data recorded in the CF card is read into the work area of the RAM 13 in response to a command issued by the CPU 11. The CPU 11 reads out an identification algorithm for file name identification from the RAM 15 to ascertain the manufacturer of the digital still camera used to record the image data.

For instance, if characters "NIKON" are detected in the name portion 132 of the sub-directory 130 in conformance to the identification algorithm with regard to the data name 120 of the image data described above, the CPU 11 decides that the manufacturer of the digital still camera used to record the image data is company A. By executing the decode program recorded in the RAM 15 which corresponds to the electronic watermark superimposing method employed by company A, the watermark information embedded in the image data is decoded and the electronic watermark is displayed on the display unit 14. In addition, if an instruction has been issued to record the image data into the storage unit 16, the image data displayed on the display unit 14 are recorded in the storage unit 16.

Figure 8:
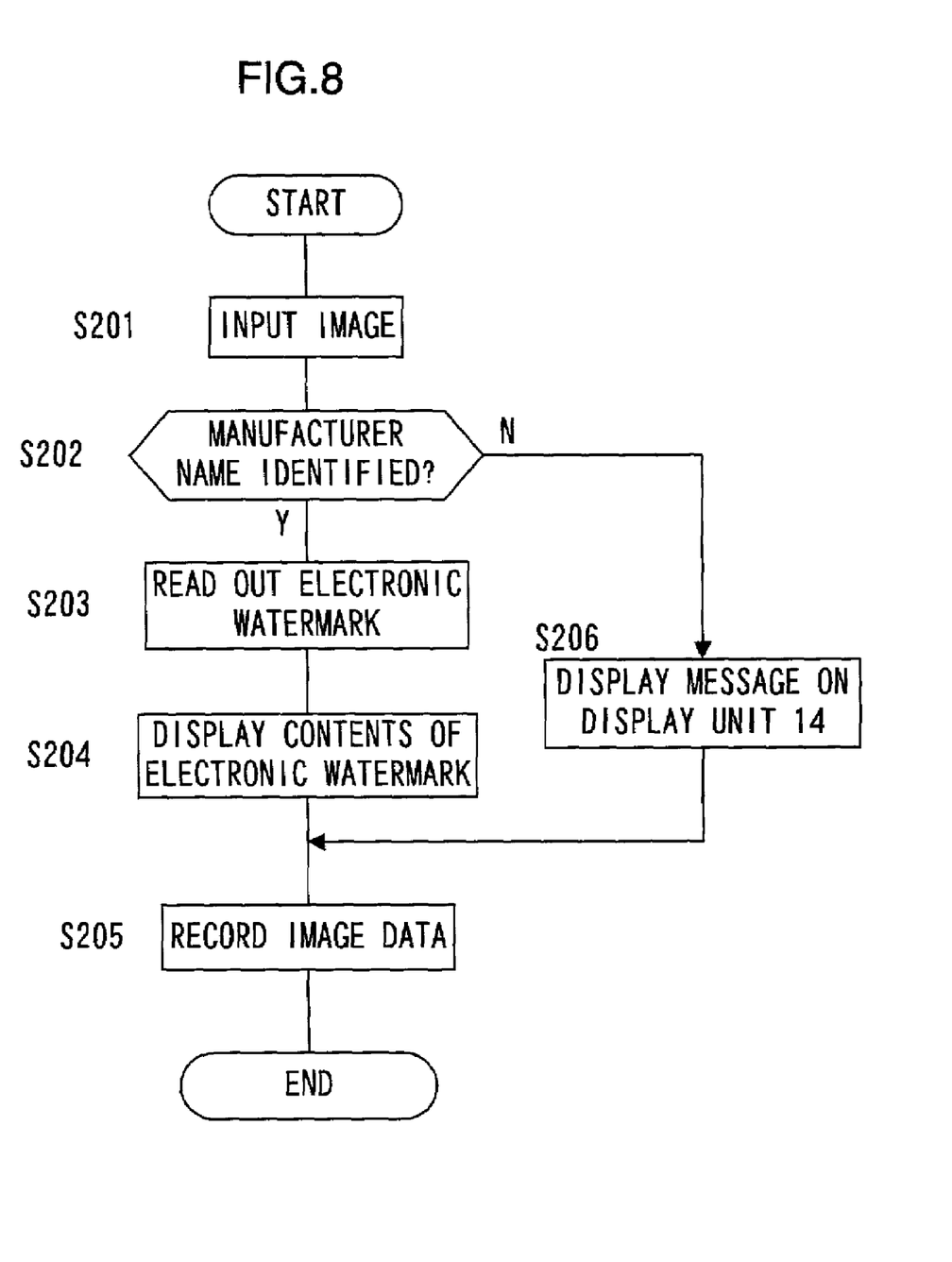
FIG. 8 is the flowchart of the identification processing executed to identify an electronic watermark superimposing method in a second embodiment.

The electronic watermark superimposing method identification processing implemented in the second embodiment is now explained in reference to the flowchart presented in FIG. 8. In step S201, as a CF card detection signal is output from the image input detection unit 18, the file name of a specific set of image data recorded in the CF card and the image data themselves are read out to the RAM 13, and the identification processing to identify the manufacturer of the digital still camera used to record the image data is started by using the image data file name read out to the RAM 13. At this point, the image data read out to the RAM 13 are simply held in the RAM 13 on a temporary basis unlike when recording the image data into the storage unit 16. In step S202, a decision is made as to whether or not the name of the manufacturer can be identified by using the algorithm adopted in the identification program read out in the RAM 15 with regard to the file name of the image data read out in the RAM 13. If it is decided that the manufacturer can be identified (step S202 Y), the operation proceeds to step S203, whereas if it is decided that the manufacturer cannot be identified (step S202 N), the operation proceeds to step S206.

Instep S203, the electronic watermark in the image data is decoded through a specific algorithm by executing the decode program adopting the electronic watermark superimposing method recorded in the RAM 15 in correspondence to the identified manufacturer and the decoded electronic watermark is displayed on the display unit 14 in step S204. The operator checks the electronic watermark displayed on the display unit 14. For instance, the operator verifies that the image data may be duplicated if the electronic watermark displayed on the display unit 14 includes copyright information. As the operator operates the operating member 19 (see FIG. 2) in step S205, the image data read out to the RAM 13 are displayed on the display unit 14 and the image data are also recorded into the storage unit 16 before the processing in FIG. 8 ends.

In step S206, a message "Manufacturer not identified from file name. Record image data?" is displayed on the display unit 14 before the operation proceeds to step S205. The operator verifies that the electronic watermark cannot be read out by reading the message displayed on the display unit 14.

In the second embodiment explained above, the manufacturer of the digital still camera used to record image data is identified by using a file name identification algorithm recorded in advance in the RAM 15 to identify the electronic watermark superimposing method and display the electronic watermark. As a result, even if it is not clear which electronic watermark superimposing method was employed to embed an electronic watermark in a given set of image data when handling a plurality of kinds of image data in the image data storage apparatus 1, the image data storage apparatus 1 automatically identifies the electronic watermark superimposing method to enable the verification of the electronic watermark. Consequently, an apparatus that enables simple and easy electronic watermark verification operation is achieved.

In the second embodiment, too, an electronic watermark read program that includes an identification program adopting a new file name identification algorithm and corresponding electronic watermark decoding program can be stored Into the RAM 15 from the program input unit 17. Accordingly, if a new manufacturer starts to sell new products having a new data name assigned to image data, an electronic watermark embedded in image data can be verified through the new electronic watermark superimposing method without having to modify the image data storage apparatus 1.

While the storage unit 16 is used as the program input unit 17 in the explanation given above, the storage unit 16 and the program input unit 17 may be provided as units independent of each other. In addition, while image data are recorded in the detachable second recording medium through the storage unit 16, a device other than a detachable recording medium such as a hard disk device may be used.

In addition, while an explanation is given above on an image data storage apparatus achieving both the image display function and the media conversion function, the present invention may also be employed in an apparatus that does not achieve a media conversion function or in a media converter that does not achieve an image display function, as well.

The RAM 15 may be constituted of a non-volatile memory, or a backup memory to back up the recorded contents when the power to the image data storage apparatus 1 is turned off. In the latter case, an electronic watermark superimposing method read program newly added from the program input unit 17 is held at the RAM 15 even while the power is off. This eliminates the need to input a new program from the program input unit 17 each time the power is turned on.

Furthermore, while the electronic watermarking method is automatically identified once a recording medium is loaded into the slot in the explanation given above, the identification processing may be started in response to an operator instruction.

The present invention is not limited to the embodiments described above. The present invention may be employed in various types of image signal processing apparatuses having an input device that inputs an image signal and an identification circuit that identifies the method employed to superimpose an electronic watermark on the image signal input through the input device.

What is claimed is:

1. An image signal processing apparatus comprising:
   an input device that inputs one of a still image signal into which one type of electronic watermark has been superimposed and a still image signal having no electronic watermark, the electronic watermark being selected from among a plurality of electronic watermarks each of which is to be decoded through one of a plurality of different electronic watermark decoding algorithms;
   a recording processing device that records the input still image signal into a recording medium:
   a memory unit that stores a plurality of different electronic watermark decoding algorithms each of which decodes the electronic watermark in the still image signal input through the input device;
   an identification circuit that judges whether or not one of the plurality of electronic watermark decoding algorithms set in advance matches algorithms employed to decode the electronic watermark in the input still image signal;
   a decode circuit that, upon the identification circuit judging a match, decodes the electronic watermark by using the electronic watermark decoding algorithms judged by the identification circuit stored in the memory unit prior to permitting the recording processing device to record the input still image signal into the recording medium; and
   a display device, wherein
   the identification circuit utilizes a first electronic watermark identification algorithm to detect the electronic watermark in the input still image signal, and if unsuccessful, utilizes a second electronic watermark identification algorithm, and so on, until a predetermined number of iterations is performed by the identification circuit and the recording processing device is permitted to record the input still image signal into the recording medium after and not before the display device displays either the electronic watermark that has been decoded by the decode circuit or a message, after the predetermined number of iterations, that no electronic watermark is detected.

2. An image signal processing apparatus according to claim 1, further comprising:
   a detection circuit that detects whether or not the still image signal has been input by said input device; and
   a control circuit that implements control on said decode circuit so as to allow said decode circuit to start the decoding of the electronic watermark when said detection circuit detects that the still image signal has been input.

3. An image signal processing apparatus according to claim 1, further comprising:
   an information input device that inputs information with respect to a new electronic watermark decoding algorithm; and
   an information adding device that adds the new electronic watermark decoding algorithm input through said information input device to the memory unit.

4. An image signal processing apparatus according to claim 1, further comprising:
   a presentation unit that presents the electronic watermark that has been decoded by the decoding circuit.

5. An image signal processing apparatus according to claim 4, wherein the presentation unit comprises a display device.

6. An image signal processing apparatus according to claim 1, wherein the electronic watermark relates to a copyright.

7. An image signal processing apparatus according to claim 1, further comprising:
   a message output device that outputs a message indicating that no algorithms match, when the identification circuit cannot judge that any electronic watermark decoding algorithms set in advance match algorithms employed to decode the electronic watermark in the input still image signal.

8. A method of identifying an electronic watermark decoding method comprising:
   inputting one of a still image signal into which one type of electronic watermark has been superimposed and a still image signal having no electronic watermark, the one type of electronic watermark being selected from among a plurality of electronic watermarks each of which is superimposed in the input still image signal and is to be decoded through one of a plurality of different electronic watermark decoding algorithms;
   judging whether or not one of the plurality of electronic watermark decoding algorithms set in advance matches algorithms employed to decode the electronic watermark in the input still image signal;
   decoding, upon judging a match, the electronic watermark in the input still image signal by using the judged electronic watermark decoding algorithms;
   recording the input still image signal into a recording medium after decoding the electronic watermark; and displaying on a display device the electronic watermark that has been decoded, wherein the judging includes utilizing a first electronic watermark identification algorithm to detect the electronic watermark in the input still image signal, and if unsuccessful, utilizing a second electronic watermark identification algorithm, and so on, until a predetermined number of iterations is performed and the input still image signal is permitted to be recorded into the recording medium after and not before the display device displays either the electronic watermark that has been decode or a message, after the predetermined number of iterations, that no electronic watermark is detected.

9. A method according to claim 8, wherein the electronic watermark relates to a copyright.

10. A method according to claim 8, further comprising:

outputting a message indicating that no algorithms match, when it is judged that no electronic watermark decoding algorithms set in advance match algorithms employed to decode the electronic watermark in the input still image signal.

* * * * *